US007338107B1

(12) United States Patent
Wilcox et al.

(10) Patent No.: US 7,338,107 B1
(45) Date of Patent: Mar. 4, 2008

(54) TAILGATE AND HINGE ASSEMBLY FOR PICKUP TRUCK

(75) Inventors: Danny Jay Wilcox, Oregon City, OR (US); Daniel George Willis, Portland, OR (US)

(73) Assignee: SNF, Inc, Fort Worth, TX (US)

( * ) Notice: Subject to any disclaimer, the term of this patent is extended or adjusted under 35 U.S.C. 154(b) by 14 days.

(21) Appl. No.: 11/514,100

(22) Filed: Sep. 1, 2006

(51) Int. Cl.
*B62D 33/03* (2006.01)

(52) U.S. Cl. .................................................... 296/57.1

(58) Field of Classification Search .................. 296/50, 296/58, 60, 59
See application file for complete search history.

(56) References Cited

U.S. PATENT DOCUMENTS 600,898 A * 3/1898 Smith ........................ 296/57.1
705,385 A * 7/1902 Coover ........................ 296/58
3,265,433 A * 8/1966 Shea ......................... 296/57.1
4,029,355 A * 6/1977 Wilhelmsen ............... 296/57.1

* cited by examiner

*Primary Examiner*—Dennis H. Pedder
(74) *Attorney, Agent, or Firm*—Herman H Bains

(57) ABSTRACT

A tailgate and hinge assembly for a pickup truck includes a pair of L-shaped hinge brackets secured to opposite sides of the truck body of the pickup truck. Each hinge bracket has an inverted U-shaped cam track therein for receiving the hinge cam pins on the tailgate. This hinge assembly allows the tailgate to be readily moved between a vertical closed position, a horizontal position and a depending vertical position. The novel hinge assembly enables the tailgate to be maintained in the open horizontal position without the need of chains or linkages.

7 Claims, 2 Drawing Sheets

TAILGATE AND HINGE ASSEMBLY FOR PICKUP TRUCK

FIELD OF THE INVENTION

This invention relates to a tailgate and hinge assembly for pickup trucks and more particularly to a tailgate and hinge assembly which enables the tailgate to be swung to an open horizontal position or to an open depending position without the need of chains or similar retaining means for holding the tailgate in a horizontal position.

BACKGROUND OF THE INVENTION

In conventional pickup trucks, the tailgate is hinged to permit access to the truck box interior by swinging the tailgate to an open horizontal position or allowing the tailgate to hang downwardly from its hinge connections. When the tailgate is retained in a horizontal position, chains or linkage are used to retain the tailgate in this horizontal position. In order to allow the tailgate to hang down, the retaining chains must be disconnected.

The use of retaining chains or linkage is an item of cost. Further, the necessity of connecting and disconnecting the chains creates an unwanted inconvenience. The present invention obviates the need of chains or linkages as retaining means.

SUMMARY OF THE INVENTION

An object of this invention is to provide a novel tailgate and hinge assembly for a pickup truck which uses a unique hinge cam arrangement for permitting shifting movement of the tailgate from a locked position to a horizontal or depending position without the need of chains or similar retaining devices.

The hinge assembly includes a pair of angle brackets mounted on the rear walls of a pickup truck. Each bracket has an inverted U-shaped hinge cam track which is engaged by hinge cam pins positioned on opposite ends of the tailgate. When the tailgate hinge cam pins are seated in the front vertical portion of the cam track, the tailgate may be positioned in a vertical locked position or it may be disposed in a horizontal position.

When the tailgate is in the horizontal position, the coaction between the hinge cam pins and cam track positively and firmly hold the tailgate in the horizontal position even when subjected to substantial weight. The tailgate may be shifted to a vertical depending position by moving the cam hinge pins of the tailgate to the rear vertical portion of the cam tracks. The unique design of the tailgate and hinge assembly obviates the need for retaining chains and linkages.

DESCRIPTION OF THE PREFERRED EMBODIMENT

Figure 1:
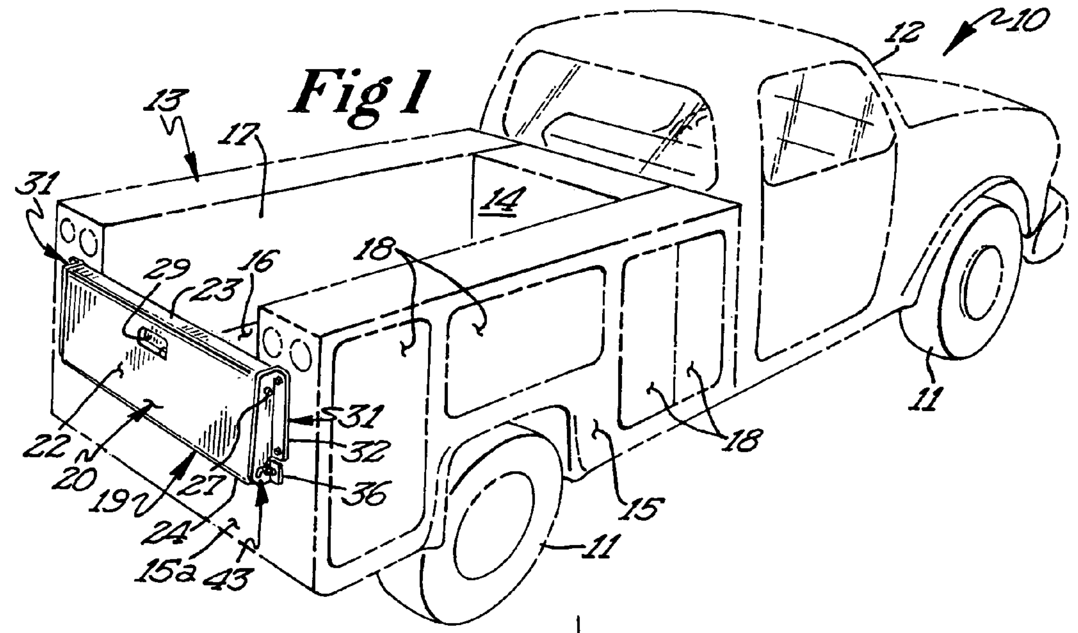
FIG. 1 is a rear partially exploded perspective view of a conventional pickup truck incorporating the novel tailgate and hinge assembly.

Referring now to the drawings, and more particularly to FIG. 1, it will be seen that a conventional pickup truck 10 incorporating the novel tailgate and hinge assembly 19 is thereshown. The pickup truck 10 includes a cab 12, ground wheels 11 and a conventional service truck body or box 13.

The service body 13 includes front wall 14, opposed side walls 15, a rear wall **15*a* and a floor 16. The tailgate 20 closes the rear access opening to the interior of the truck body. The side walls 15 are provided with compartments 18 for use in containing tools and equipment. It is pointed out that the novel tailgate and hinge assembly 19** may be used with conventional non-service type truck bodies.

The tailgate and hinge assembly 19 include the tailgate 20 and the hinge assembly 30. The tailgate 20 includes a front wall 21, a rear wall 22, top wall 23 and a bottom wall 24. The tailgate also includes substantially flat end plates 25. Each end plate is provided with a blind threaded insert 26 which accommodates the threaded portion of a shoulder bolt **26*a*. The shoulder bolt 26*a* is provided with a cylindrical shoulder 26*b*. The tailgate is provided with an actuating handle 29 located in an opening in the mid-portion of the rear wall of the tailgate. The actuating handle operates the locking mechanism which is described herein below. It is pointed out that the end plates 25 and front wall 21 have forwardly opening slots 28** therein for accommodating and accessing the locking mechanism for the tailgate.

The hinge assembly 30 comprises a pair of similar vertically disposed L-shape hinge brackets 31 each including an elongate flat vertical attachment plate 32 and an elongate vertical tailgate engaging plate 41. Each attachment plate is positioned against and secured to the rear wall **15*a* on either side of the truck body by suitable nut and bolt assemblies 34 which extend through openings 33 in the attachment plates. Each angle bracket 31 is therefore secured to the rear wall 15*a*** of the truck body.

Figure 2:
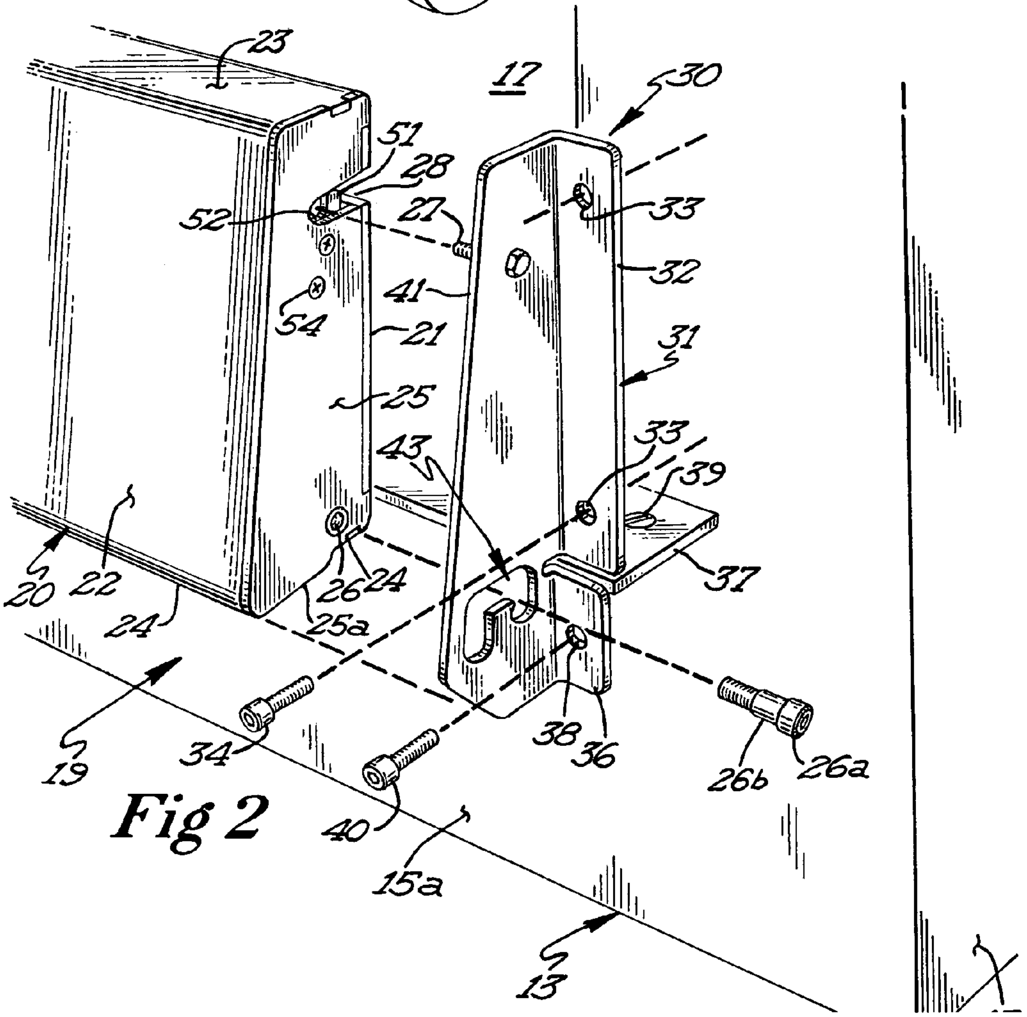
FIG. 2 is a fragmentary exploded perspective view of a portion of the tailgate and illustrating details of construction of one of the angle brackets.
Figure 3:
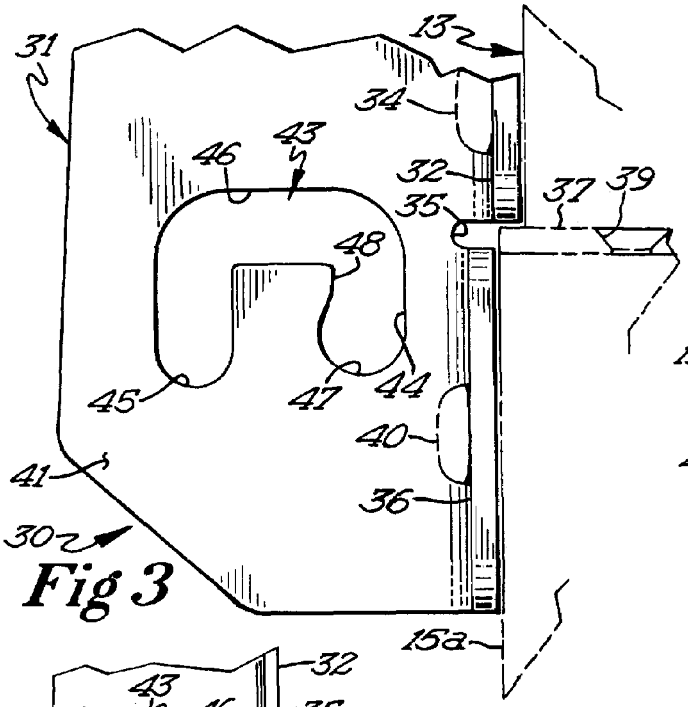
FIG. 3 is an enlarged side view of a portion of the angle bracket illustrating the configuration of the cam track.

Referring now to FIGS. 2 and 3, it will be seen that a slot 35 is formed in the attachment plate 32 and extends into the tailgate engaging plate 41. The slot 35 defines an offset lower portion 36 of the attachment plate. This lower portion 36 of the attachment plate 32 is offset rearwardly as best seen in FIG. 3. This offset corresponds to the thickness dimension of the attachment plate.

The offset lower portion 36 is provided with an opening 38 disposed in registering relation with an opening 39 in a flat mounting plate 37. The mounting plate 37 extends substantially the entire width of the truck body or box 13 and the attachment plate 32 is secured to the mounting plate 37 by nut and bolt assemblies 40. The mounting plate is secured through the truck body by bolts into structural members of the truck. It will be noted in FIG. 3 that the mounting plate 37 is disposed in coplanar relation with the attachment plate

32 of each hinge bracket 31. The lower edge of plate 32 rests on the upper edge of mounting plate 37.

The tailgate engaging plate 41 of each hinge bracket is vertically disposed and is of substantially flat configuration. The upper portion of the plate 41 has threaded opening 42 therethrough for accommodating a locking bolt 27. Each locking bolt 27 projects through the slot 28 for engagement with the rotary latch mechanism. The plate 41 is also provided with an inverted U-shaped opening 43 therein adjacent the lower portion thereof, as best seen in FIG. 2. The opening 43 includes a front vertical track portion 44, a rear track vertical portion 45 and a horizontal track portion 46. The cylindrical shoulder **26*b* of the shoulder bolts 26*a* engages in the inverted U-shaped opening 43. The shoulders of the pins function as cam followers in the cam track defined by the inverted U-shaped opening 43. It is pointed out that the hinge pins 26*a*** could be provided with cam follower rollers to facilitate movement of the hinge elements in the cam track.

Referring now to FIG. 3, it will be seen that the rear track portion 45 of the opening 43 has a vertical dimension greater than the vertical dimension of the front track portion 44. The rear portion 45 of opening extends vertically downwardly a slightly greater distance than the front portion 44. It will also be noted that the seat 47 of the front portion 44 has a greater transverse dimension or diameter than the remaining portion of the front portion 44. The enlarged seat 47 defines an overhang 48 which serves to retain the hinge cam pins 26 in seated relation when the tailgate 20 is in the horizontal position.

Figure 7:
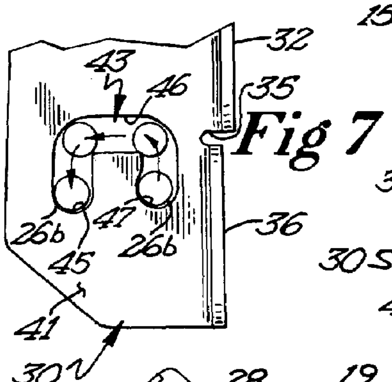
FIG. 7 is a diagrammatic side view of the cam track and hinge pin illustrated in full line and phantom line configuration depicting the sequential positions of a hinge pin in the cam track moving from a vertical closed or a horizontal position to a depending position.

Referring now to FIGS. 4-7, it will be seen that the tailgate is illustrated in the vertically locked position, the open horizontal position and the open depending position. FIG. 7 diagrammatically illustrates a hinge cam pin in various positions as the tailgate is moved.

Figure 4:
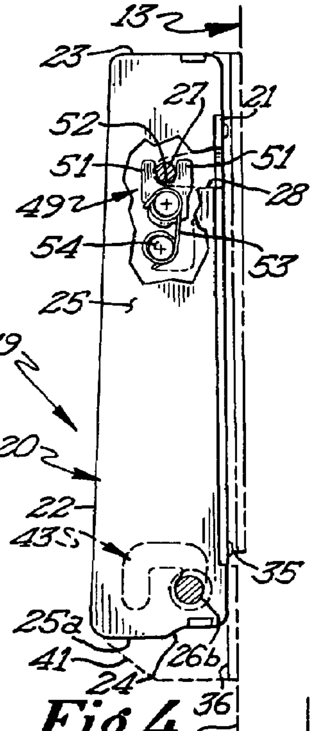
FIG. 4 is a side elevational view of the tailgate in the vertical closed position.

In FIG. 4, the tailgate is depicted in the vertical closed position. The locking bolts 27 project through the slots 28 and engage the spring-urged rotary locking mechanisms 49. Each locking mechanism 49 is pivoted on a pivot pin 50 located adjacent and below the associated slot 28. Each locking mechanism has a pair of detents 51 which define a notch 52 therebetween. Each locking mechanism 49 is engaged by a spring 53 which is anchored to a bolt 54. The locking mechanism is urged by the associated spring 53 past an over center position to either a locking or release position.

Figure 5:
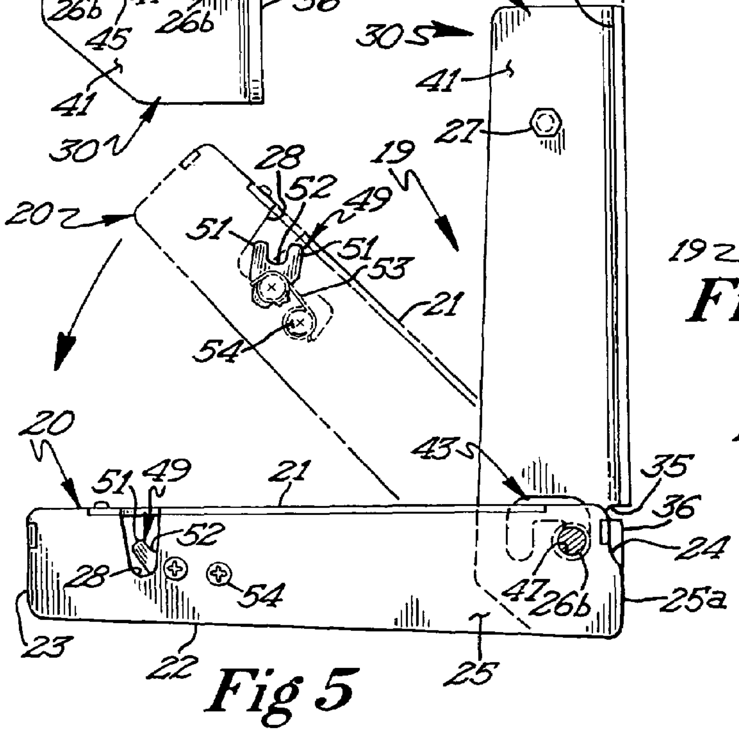
FIG. 5 is a side elevational view similar to FIG. 4 but showing the tailgate in the horizontal position, the phantom line configuration depicting the tailgate in an intermediate position.
Figure 6:
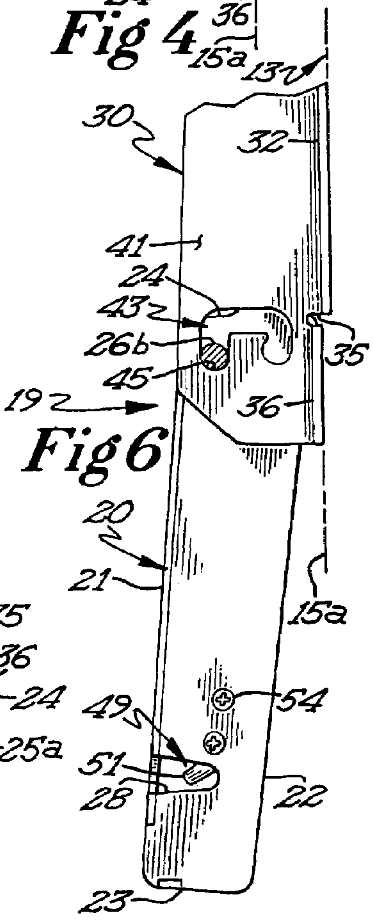
FIG. 6 is a side elevational view similar to FIGS. 4 and 5 but illustrating the tailgate in the depending position.

When the tailgate is in the locked position (FIG. 4), the actuating handle may be pulled or otherwise operated which rotates the locking mechanism to an over center release position thereby allowing the tailgate to be moved to the positions illustrated in FIGS. 5 and 6. When the tailgate is moved to the closed position, the locking bolts will engage a detent 51 and cam the locking mechanism past an over center position to a locked position.

When the tailgate is in the horizontal position (FIG. 5), it will be seen that the hinge cam pins **26*a* will be disposed in the seat 47 of the front vertical track portion 44. The lower edges of the end plates 25 and the bottom wall of the tailgate define a heel plate 25*a* which engages the rear wall of the truck body when the tailgate is in the horizontal position. The overhang surface 48 of the front track portion 44 serves to prevent accidental displacement of the hinge cam pins from the firm seated relation in the seat 47. The engagement of the heel plate 25*a* with the truck body and the firm seating of the hinge cam pins in the seat 47** enables the tailgate to support several hundred pounds when in the horizontal position. This firm stable position of the tailgate is accomplished without chains or linkages.

The tailgate 20 may be moved to a depending position (FIG. 6) by moving the cam hinge pins out of seated relation in the seat 47 to the seated position of the pins shown in FIG. 6. The tailgate will be moved towards the closing position in the rear track portion 45. The tailgate will be declined downwardly and slightly rearwardly as shown in FIG. 6.

It will therefore be seen that the tailgate may be readily moved to and from a locked vertical position, a horizontal position and a depending position with a minimum of effort.

The tailgate will be retained in the horizontal position without the use of chains and linkages and is able to support substantial weight when in the horizontal position.

Thus it will be seen that a novel tailgate and hinge assembly has been provided which is of simple and inexpensive construction but which functions in a highly efficient manner.

What is claimed is:

1. A tailgate and hinge assembly for use with a pickup truck having a truck body including a floor, front wall, side walls, a rear wall and an open rear end, said tailgate being of generally rectangular shaped configuration for opening and closing the open rear end of the truck body and including front and rear vertical walls, a top wall, a bottom wall and end plates, a pair of hinge cam pins each being secured to one of said end plates adjacent the lower portion thereof and projecting laterally outwardly therefrom, said hinge assembly including a pair of vertically disposed L-shaped hinge brackets, means for securing each hinge bracket to the rear wall of the truck body adjacent one of the side walls thereof, each hinge bracket including a tailgate engaging hinge plate projecting rearwardly from the truck body when the hinge brackets are secured to the truck body, each hinge plate having an inverted U-shaped opening defining a cam track, each cam track receiving one of the hinge cam pins therein, said cam track including a front vertical track portion, a horizontal track portion and a rear vertical track portion, the hinge cam pins being seated in the lower end of the front cam track when the tailgate is in a vertical closing position or when the tailgate is in an open horizontal position, the hinge cam pins being seated in the lower end of the rear vertical track when the tailgate is in a lower depending position, the tailgate being retained in the horizontal position by abutment to the truck body, and locking means on the tailgate and hinge assembly for locking the tailgate in the vertical closed position.

2. The tailgate and hinge assembly as defined in claim 1 wherein the bottom wall of the tailgate defines a heel plate for engaging the truck body when the tailgate is in the horizontal position.

3. The tailgate and hinge assembly as defined in a claim 2 wherein the lower end of the front vertical cam track for each hinge plate defines a seat having a larger transverse dimension than the remaining portions of the cam track.

4. The tailgate and hinge assembly as defined in claim 3 wherein said front vertical track portion has an overhang portion defined by the enlarged seat, the overhang portion cooperating with the heel plate for retaining the tailgate in the horizontal position.

5. The tailgate and hinge assembly as defined in claim 1 wherein the vertical dimension of each rear vertical track portion is greater than the vertical dimension of each front vertical track portion to allow the tailgate to drop far enough in the rear vertical track portions to be even or below the bed to not restrict loading or unloading.

6. The tailgate and hinge assembly as defined in claim 1 wherein said means for securing the hinge brackets to the rear wall of the truck body includes an attachment plate for each hinge bracket and disposed at substantially right angular relationship to the associated hinge plate, and attachment elements for securing each attachment plate to the truck body.

7. The tailgate and hinge assembly as defined in claim 6 and an elongate vertically disposed plate, attachment means for securing the plate to the rear wall of the truck body adjacent the floor, the attachment plate for each hinge bracket being secured to the vertically disposed plate.

* * * * *